Feb. 16, 1937.  F. H. ASAM  2,070,569
AUTOMOTIVE DIFFERENTIAL GEARING
Filed Aug. 28, 1935  3 Sheets-Sheet 2
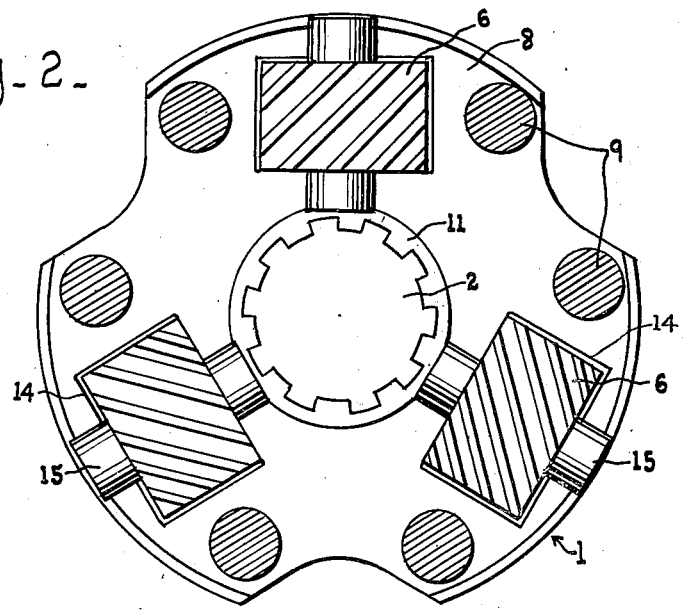
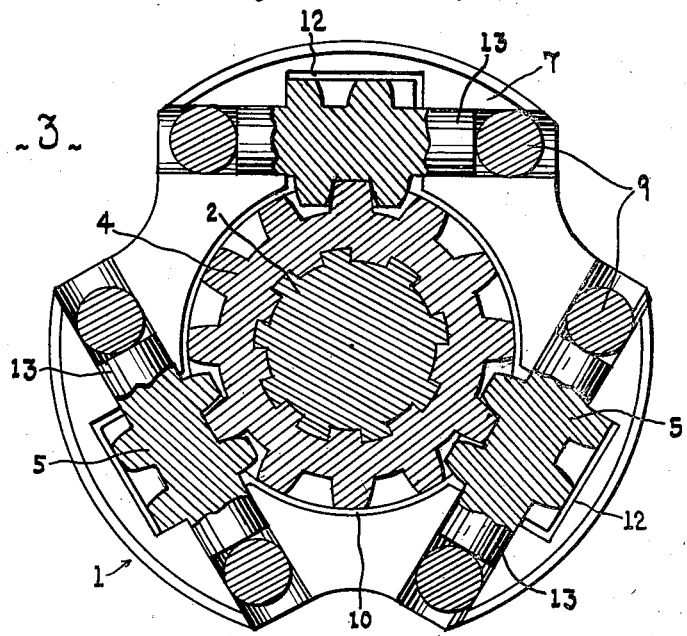
INVENTOR
Frank H. Asam
BY
J.S. Murray
ATTORNEY Feb. 16, 1937.  F. H. ASAM  2,070,569
AUTOMOTIVE DIFFERENTIAL GEARING
Filed Aug. 28, 1935   3 Sheets-Sheet 3

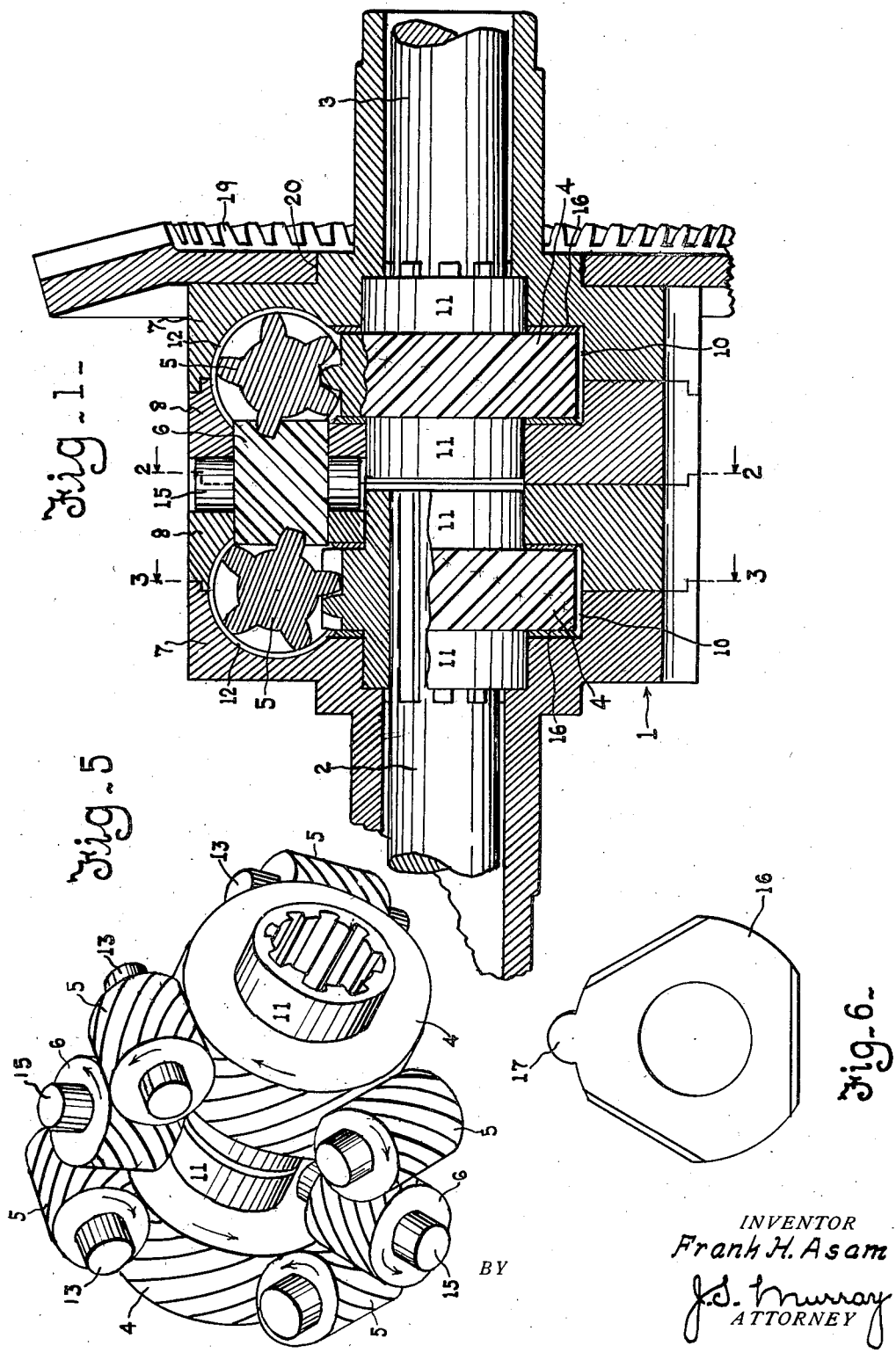

INVENTOR
Frank H. Asam
BY
J. S. Murray
ATTORNEY

Patented Feb. 16, 1937

2,070,569

UNITED STATES PATENT OFFICE 2,070,569

AUTOMOTIVE DIFFERENTIAL GEARING

Frank H. Asam, Detroit, Mich., assignor to Francis O. Gaukler, Detroit, Mich.

Application August 28, 1935, Serial No. 38,220

5 Claims. (Cl. 74—313)

This invention relates to differential gearings and particularly to improvements upon the automotive differential gearing disclosed by the Muehl patent 1,090,082 of Mar. 10, 1914.

In the Muehl patent, a pair of spiral gears are fixed on two aligned driven shafts, and are tangentially engaged by two sets of spiral pinions, between which and engaging both thereof, is mounted a set of radial spiral pinions, the gearing being received by a casing adapted, when driven, to carry the pinions bodily about the axis of the shafts. This gearing is designed to eliminate the complete loss of traction occurring when either of a pair of wheels driven through an ordinary differential gearing entirely loses its tractive force.

It is the object of the invention to so form the casing and pinions of a Muehl type of differential gearing that the strength of the pinions will be greatly increased, their accurate assembly may be more readily accomplished, and they will be more easily accessible for inspection, repairs, or replacement.

These and various other objects the invention attains by the construction hereinafter described, and illustrated in the accompanying drawings, wherein:

Fig. 1 is a view of the improved gearing in axial sectional elevation.

Fig. 2 is a cross sectional view taken upon the line 2—2 of Fig. 1.

Fig. 3 is another cross section taken upon the line 3—3 of Fig. 1.

Fig. 5 is a perspective view, showing the relative positions of the gears and pinions, and indicating the spiral pitch of the teeth, and exemplifying the various directions of rotation for differential driving.

Fig. 6 is a front view of one of several washers of special design, employed in the construction.

Figure 4:
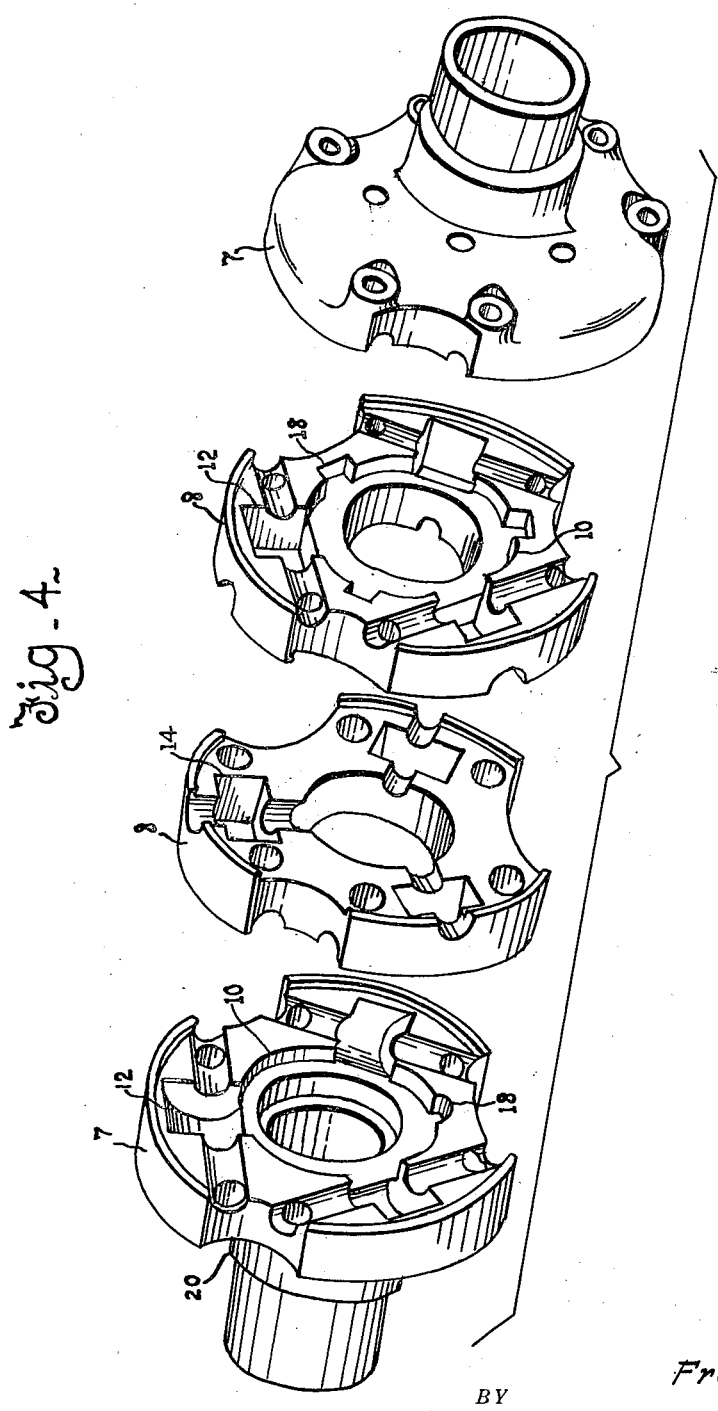
Fig. 4 is a perspective view of the casing, with its sections disassembled.

Primarily, the invention comprises a rotative casing 1, a pair of aligned live axle sections 2 and 3, oppositely entering and approximately meeting within the casing, a pair of spiral gears 4, fast on said sections in the casing, two sets of planetary spiral pinions 5, each set meshing with one of said gears, and a third set of spiral pinions 6, radially journaled in the casing and interconnecting the two first mentioned sets.

The casing comprises two end sections 7, two intermediate sections 8, and a plurality of bolts 9 extending lengthwise through the sections and rigidly clamping them together.

The gears 4 are splined, one on each axle section, in chambers 10 jointly formed by the end and intermediate casing sections, and are formed with hubs 11 journaled in said sections. The axes of the pinions 5 lie in the meeting planes of the end and intermediate casing sections, which jointly form chambers 12, individually accommodating said pinions. The latter are journaled tangentially of the gears 4 by stub shafts 13, integral with said pinions. The two intermediate casing sections jointly form chambers 14, individually accommodating the pinions 6, which have stub shafts 15 radially journaling said pinions.

The teeth of both gears and of all of the pinions are pitched at forty-five degrees, this being essential to the desired differential action.

The end thrust incident to the spiral form of the gears is taken by hardened steel washers 16 a pair of which engage the hubs of each gear. Said washers are each formed with a peripheral lug 17 fitting into a suitable groove 18 of the casing, and are thus held from rotation.

Rotation may be applied to the casing 1 in any desired manner, there being illustrated, for that purpose, a bevel gear 19 engaging an annular shoulder 20 formed on one of the casing end sections, a drive from said gear to the casing being established by the bolts 9.

In operation of the described gearing, there is, ordinarily, a balanced delivery of power to the two axle sections, and consequent elimination of any tendency to relative rotation of the pinions and gears. When differential action is required, as during turning of a vehicle equipped with the described drive gearing, the resulting relative rotation of the pinions and gears is as exemplified in Fig. 5.

The primary advantage of this type of differential lies in its ability to maintain a delivery of power to both axle sections, when there is a partial or complete loss of traction at one of the driven wheels. This ability arises from the fact that the pinions and gears offer quite a considerable resistance to relative rotation and jointly establishing a fulcrum, to maintain a drive to both wheels whether or not they are delivering traction.

Upon loosening the bolts 9, the casing may be opened up at any of its joints, giving access to any desired pinion or gear, without disturbance of more than one set of pinions.

The construction obviously lends itself to a rapid and compact assembly, to accurate engagement of the gearing elements, and to adequate driving strength.

The invention is presented as including all such modifications and changes as come within the scope of the following claims.

What I claim is:

1. In a differential gearing, a casing comprising two end sections and two intermediate sections, and means rigidly and detachably connecting said sections, a pair of aligned driven shafts entered in opposite ends of the casing, a pair of spiral gears fixed on said shafts in the casing, two sets of spiral pinions, the respective sets tangentially meshing with the respective gears, said pinions being journaled at both their inner and outer ends jointly in and jointly housed in the end and intermediate casing sections, and a third set of spiral pinions journaled jointly in the two intermediate sections of the casing and individually accommodated in chambers jointly formed by the intermediate sections, and each meshing with a pinion of each of the first-mentioned sets.

2. In a differential gearing, a casing comprising two end sections and two intermediate sections, and means rigidly and detachably connecting said sections in end to end relation, a pair of aligned driven shafts entered in opposite ends of the casing, a pair of spiral gears fixed on said shafts in the casing, and formed with outer hubs journaled in the end sections and inner hubs journaled in the intermediate sections, a set of spiral pinions tangentially meshing with each gear and each having a pair of stub shafts, the casing being formed, jointly in its end and intermediate sections, with chambers individually accommodating said pinions and with bearings for the stub shafts, and a third set of spiral pinions, mounted in a radial relation to the casing and each having a pair of stub shafts, and each meshing with a pinion of each of the first-mentioned sets, the intermediate sections of the casing being jointly formed with chambers individually accommodating the pinions of the third set and being further jointly formed with bearings for the stub shafts of such pinions.

3. In a differential gearing, a casing comprising a plurality of sections, a pair of aligned driven shafts oppositely entered in the casing, a pair of spiral gears fixed on the shafts in the casing, two sets of spiral pinions journaled in the casing, said sets respectively tangentially meshing with the respective gears, bolts rigidly and detachably connecting the sections of the casing and receiving the end thrust of said pinions, and a third set of spiral pinions radially positioned in the casing and meshing jointly with the pinions of the two first-mentioned sets.

4. In a differential gearing, a casing comprising two end sections and two intermediate sections, and means rigidly and detachably connecting said sections in end to end relation, a pair of aligned driven shafts entered in opposite ends of the casing, a pair of spiral gears fixed on said shafts in the casing, a set of spiral pinions tangentially meshing with each gear and each having a pair of stub shafts, the casing being formed, jointly in its end and intermediate sections, with chambers individually accommodating said pinions and with bearings for the stub shafts, and a third set of spiral pinions, mounted in a radial relation to the casing and each having a pair of stub shafts, and each meshing with a pinion of each of the first-mentioned sets, the intermediate sections of the casing being jointly formed with chambers individually accommodating the pinions of the third set and being further jointly formed with bearings for the stub shafts of such pinions.

5. In a differential gearing, a casing comprising two end sections and two intermediate sections, and means rigidly and detachably connecting said sections in end to end relation, a pair of aligned driven shafts entered in opposite ends of the casing, a pair of spiral gears fixed on said shafts in the casing, and each having a hub journaled in one of said sections, a set of spiral pinions tangentially meshing with each gear and each having a pair of stub shafts, the casing being formed, jointly in its end and intermediate sections, with chambers individually accommodating said pinions and with bearings for the stub shafts, and a third set of spiral pinions, mounted in a radial relation to the casing and each having a pair of stub shafts, and each meshing with a pinion of each of the first-mentioned sets, the intermediate sections of the casing being jointly formed with chambers individually accommodating the pinions of the third set and being further jointly formed with bearings for the stub shafts of such pinions.

FRANK H. ASAM.